United States Patent [19]
Munro et al.

[11] 3,800,423
[45] Apr. 2, 1974

[54] METHOD AND APPARATUS FOR MEASURING PITCH OR INDEXING ERRORS IN TOOTHED MEMBERS

[75] Inventors: Robert G. Munro, Huddersfield; Rodney B. Hale, Watford, both of England

[73] Assignee: J. Goulder & Sons Limited, Huddersfield, England

[22] Filed: Oct. 26, 1972

[21] Appl. No.: 301,064

Related U.S. Application Data

[63] Continuation-in-part of Ser. No. 118,133, Feb. 23, 1971, abandoned.

[30] Foreign Application Priority Data

Feb. 26, 1970   Great Britain.................9330/70

[52] U.S. Cl. ............................................. 33/179.5
[51] Int. Cl........................ G01b 19/26, G01b 5/20
[58] Field of Search.................. 33/179.5 R, 174 P

[56] References Cited
UNITED STATES PATENTS

| | | | |
|---|---|---|---|
| 3,231,813 | 1/1966 | Vanator | 33/179.5 X |
| 2,992,491 | 7/1961 | Hofler | 33/179.5 X |
| 3,263,163 | 7/1966 | Foster et al. | 33/179.5 X |
| 3,281,665 | 10/1966 | Foster et al. | 33/179.5 X |
| 3,522,524 | 8/1970 | Smith et al. | 33/179.5 X |
| 2,938,275 | 5/1960 | Hofler | 33/179.5 |

Primary Examiner—John W. Huckert
Assistant Examiner—Milton S. Gerstein
Attorney, Agent, or Firm—Young and Thompson

[57] ABSTRACT

The described apparatus for measuring pitch errors in a gear wheel consists of a motor-driven continuously-rotatable support for the gear wheel, to which support is coupled a circular grating type pulse generator whose electrical pulse output is electronically processed by a multiplier and a divider to produce a reference pulse train whose count is directly proportional to the tooth pitch of the gear wheel. These pulses are then shaped to produce a train of clearly defined reference signals. A reciprocatory probe carrier is provided for inserting a probe successively into the spaces between adjacent gear teeth synchromously with rotation of the gear. A sample-and-hold amplifier passes a probe deflection signal to a recorder on each occurrence of a reference signal. A trigger device connected to the probe output is used during the initial probe deflection to make the first reference pulse coincide with the arbitary value of probe deflection signal selected conveniently on approximately 50 percent of the maximum value of probe deflection signal. Thereafter, the probe deflection signals are measured on the occurence of each subsequent reference signal and deviation from the selected value is recorded.

8 Claims, 4 Drawing Figures

PATENTED APR 2 1974

METHOD AND APPARATUS FOR MEASURING PITCH OR INDEXING ERRORS IN TOOTHED MEMBERS

This application is a continuation-in-part of my U.S. Pat. application Ser. No. 118,133, filed Feb. 23, 1971, and now abandoned.

The present invention relates to a method and apparatus for measuring errors in the tooth spacing or tooth pitch of gear wheels.

According to the present invention, there is provided apparatus for measuring errors in the tooth pitch of a gear wheel, comprising a continuously rotatable support whereon a gear wheel may be mounted co-axially with the support for rotation therewith, a pulse generator, connected to the rotatable support and adapted to produce a train of source pulses whose count is proportional to angular displacement of the rotatable support, digital processing means connected to the pulse generator and adapted to convert the source pulse train to a train of reference signals which are mutually spaced according to the specified tooth pitch of a gear wheel and including means operable to synchronise the reference signals with an external event, a measuring probe having a stylus which can be influenced so as to produce a tooth position signal of amplitude proportional to the amount by which the stylus is influenced, means cooperatively associated with the support and with the measuring probe and adapted to insert from a fixed station adjacent the periphery of the rotatable support the stylus a selected radial distance into successive tooth spaces of a gear wheel when mounted on and rotated continuously by the rotatable support and to withdraw the stylus from each tooth space after the stylus has been influenced by a tooth flank, a trigger device connected to the probe and to the synthronising means of the digital processing means and sensitive to a selected intermediate amplitude value of the tooth position signal and operative on a first single occurrence of the said intermediate amplitude value to synchronise the train of reference signals with the event of said intermediate amplitude value, a sampling device connected to the probe and to the digital processing means and adapted to measure the instantaneous amplitude value of the tooth position signal on the occurrence of each reference signal, and means connected to the sampling device for indicating or recording the instantaneous amplitude values measured by the sampling device.

An embodiment of the present invention will now be described by way of example, with reference to the accompanying drawings in which.

Figure 1:
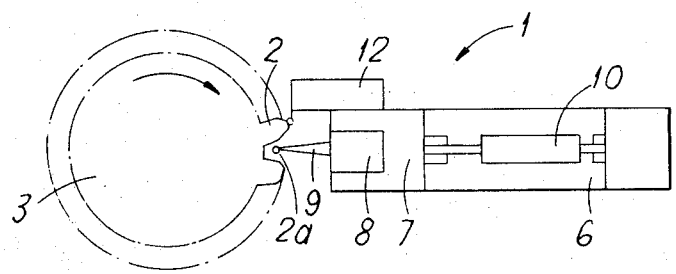
FIG. 1 shows a schematic plan view of apparatus according to the present invention for measuring pitch errors in a gear wheel.
Figure 2:
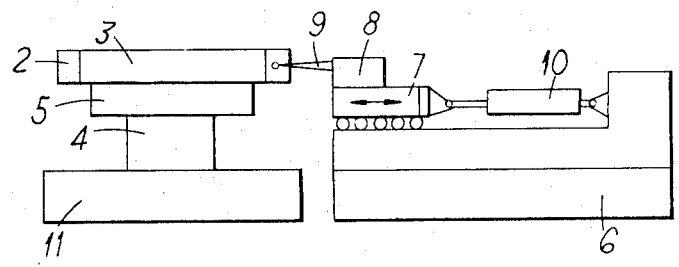
FIG. 2 shows a schematic side view of the apparatus of FIG. 1.

In FIGS. 1 and 2, apparatus 1 for measuring errors in the pitch of the teeth 2 of a gear wheel 3 includes a vertical shaft 4 journalled in a bearing (not shown). At the upper end of the shaft, 4, there is located a face-plate 5 or similar support for mounting the gear wheel 3 co-axial with the shaft 4. A drive (not shown) such as, for example, an electric motor is provided for the shaft 4 such that the gear wheel 3 can be rotated continuously at a reasonably uniform speed. It will be appreciated from a consideration of the disclosure herein following that the uniformity of rotational speed of the gear wheel is not a critical factor. As an indication, it may be stated that the shaft 4 could be rotated manually without impairing the functioning of the apparatus.

Adjacent the shaft 4, and gear wheel 3, there is located a guideway whereon is mounted a carriage 7 which is reciprocable on the guideway 6 in the directions indicated by the double-headed arrow in FIG. 2, that is radially of the gear wheel 3. A mechanical-to-electrical transducing measuring probe 8 is mounted on the carriage 7. The probe 8 is a conventional device, well known in the art of metrology and has an articulated stylus 9 which normally assumes, under the influence of an internal spring (not shown) or the like, a position co-axial with the main body of the probe 8. Thus the stylus 9 can be deflected and so activate the probe to produce as electrical signal whose magnitude is proportional to the amount of the deflection. The arrangement of the probe 8 on the carriage 7 is such that the stylus 9 of the probe 8 is disposed radially relative to the gear wheel 3 and can be inserted a selected radial distance into and withdrawn from successive tooth spaces of the gear wheel 3 while the latter is continuously rotated by the shaft 4, by virtue of the carriage 7 being driven so as to insert the stylus 9 into a tooth space, dwell for a short period, and then withdraw the stylus 9 from the same tooth space all in synchronism with the movement of the gear teeth past the guideway 6. Driving of the carriage 7 is effected by means of a pneumatically operable piston-and-cylinder device 10 under the control of a circuit (not shown) including a synchronising micro-switch 12 operable on engagement with a tooth to actuate the piston-and-cylinder device 10 to insert the stylus 9 forward into a tooth space 2a. The micro-switch 12 is fixed in a position such that it is actuated by a tooth just as a tooth-space is being presented to the stylus 9 which enters the tooth space and dwells there while the micro-switch remains engaged with a tooth. After continued rotation of the gear wheel 3, the switch 12 disengages the tooth 2 and thus the piston-and-cylinder device 10 is caused to retract the stylus 9 clear of the gear wheel 3 by which time the stylus 9 will have been deflected by a tooth flank sufficient to produce a useful signal from the probe 8. An adjustable stop (not shown) is provided for accurate radial location of the stylus 9 at its inserted position. The practical details required to construct the piston-and-cylinder device 10, the associated control circuit (not shown), and the micro-switch, 12, and to arrange for these items to function as herein described will present no difficulty to persons skilled in or making reference to the appropriate art or arts, and accordingly these details are not included herein.

The distance by which the stylus 9 is inserted into a tooth space is selected according to the size of the reference circle radius, but the precise point on a tooth flank contacted by the stylus 9 is not critical so long as the radial insertion distance is constant during one complete test.

The probe 8 produces a "tooth position" signal of voltage amplitude proportional to the deflection of the stylus 9.

Figure 4:
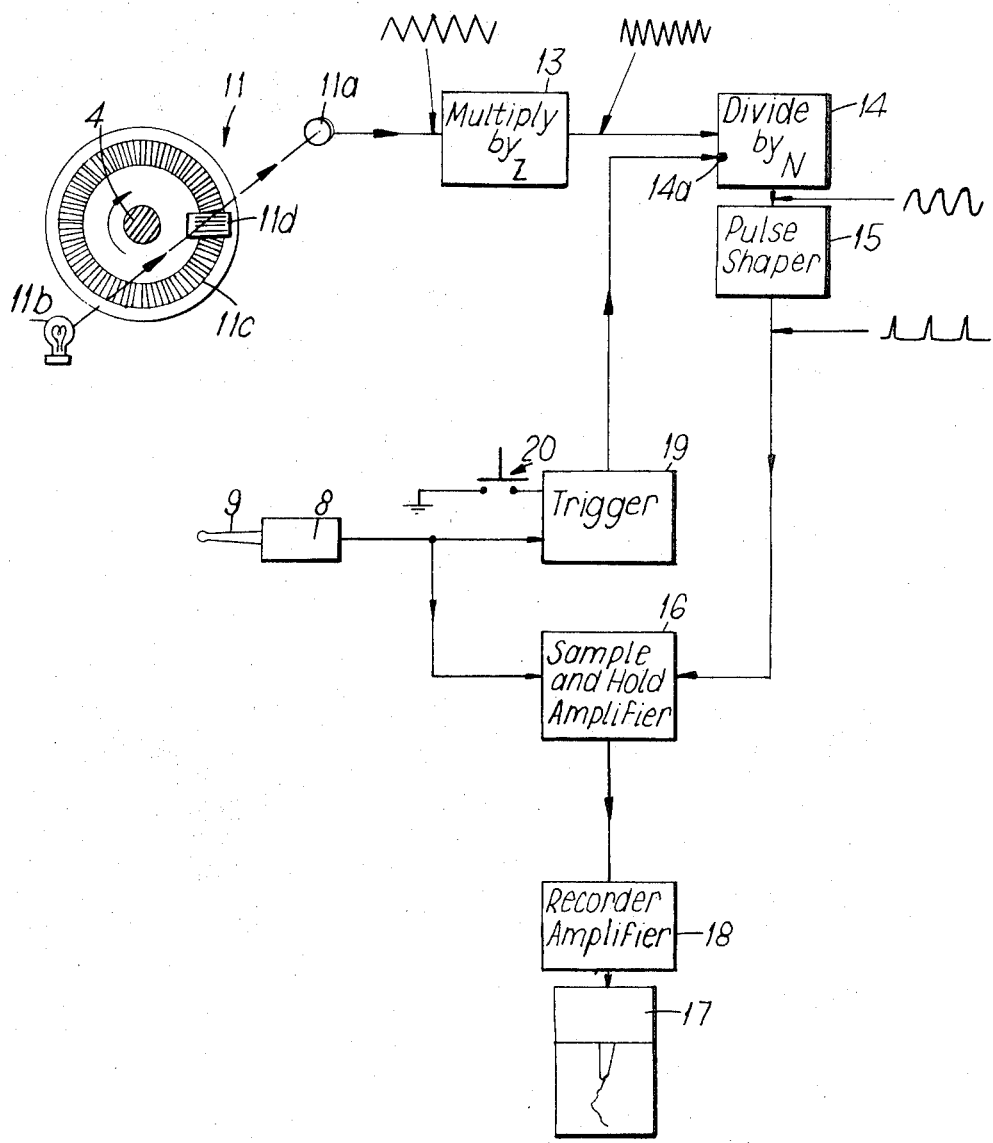
FIG. 4 shows, in block-diagram form, the arrangement of the electrical or electronic components of apparatus in accordance with the present invention.

Below the shaft 4, there is located apparatus 11 for providing a train of electric source pulses. This apparatus 11, which is illustrated schematically in FIG. 4 and which is known in the art of gear metrology, includes a photo-electric transducer 11a, a light-source 11b, a circular grating 11c secured to and concentric with the shaft 4, and one or more fixed reference gratings 11d arranged over the circular grating for interrupting a beam of light between the light source 11b and the photo-electric transducer 11a. Thus, when the shaft 4 is rotated and with it the circular grating 11c, a moire fringe effect is obtained which produces fluctuations in light intensity falling on the photo-electric transducer from the light source 11b and results in a train of electric source pulses being produced by the photo-electric transducer 11a. The source pulse count per revolution of shaft 4 is dependent upon the line frequency or line density of the gratings. This latter parameter is chosen a high value in the interests of accuracy in relation to resolving small changes in angular position of the gear wheel 3 during rotation.

The source pulses produced per revolution of the shaft 4 are converted to "reference" signals according to the number of teeth 2 of the gear wheel 3, that is according to the specified angular spacing between successive teeth of the gear wheel 3. This is achieved by digital processing apparatus shown in FIG. 4. An electronic multiplier 13 is provided to multiply the count of source pulses produced, say N, by the number of gear teeth, say Z. Thus an intermediate train of pulses corresponding to NZ per revolution of the shaft 4 is produced. This intermediate train of pulses NZ is divided by means of an electronic divider 14, by the value N so that a train of reference pulses or signals of count Z per revolution of the shaft 4 is produced. Reference signals are thus made available one for each tooth and according to the specified angular spacing between the teeth of the gear wheel 3. The divider 14 is in the form of an electronic counter capable of synchronisation with an external event by a trigger signal applied to a "re-set" input terminal indicated by reference numeral 14a in FIG. 4. A pulse shaper 15 is associated with the divider 14 and serves to improve the sharpness of definition of the reference signals using known techniques for pulse shaping.

The reference signal output from the pulse shaper 15 together with the tooth position signal from the probe 8 are fed to a sampling device in the form of a sample-and-hold amplifier 16, the arrangement being such that on the occurrence of each reference signal the instantaneous amplitude value of the tooth position signal from the probe 8 is measured and temporarily held by the sample-and-hold amplifier 16 and fed as an output from the latter to a recorder 17 by way of a recorder amplifier 18. Thus is obtained a series of tooth position values in the form of a graphic record corresponding with the actual instantaneous deflections of the stylus 9 at precisely equal angular intervals of rotation of the gear wheel, each angular interval being that subtended by the specified pitch between adjacent gear teeth. In order to cause each reference signal to co-incide with the presence of a useful tooth-position signal in the sample-and-hold amplifier, an electronic trigger device 19, for example a bi-stable device, is interposed between the output from the probe 8 and the "re-set" input of the divider 14. The trigger device 19 provides a single re-setting pulse for the divider 14 and is adjusted to fire upon first receipt of a preselected intermediate amplitude value of the tooth position signal from the probe 8. Conveniently the said preselected amplitude value is approximately half-way along the "ramp" wave-form of the probe output, that is approximately one-half of the maximum amplitude value of tooth position signal which the probe 8 is capable of providing. Thus, after the trigger 19 has fired, the sample-and-hold amplifier 16 will measure deviations of instantaneous amplitude values from (above and below) the preselected intermediate amplitude value so providing information equivalent to absolute pitch error measurement. The trigger is re-set, prior to commencing a subsequent series of measurements, by means of a re-set switch 20.

The recorder 17 may be either an analogue recorder or a digital recorder.

All of the electronic devices herein referred to are per se known in the electronic art. An appropriately skilled person would therefore possess or have available to him detailed information sufficient to enable the construction of these devices. Accordingly, the present disclosure does not specifically recite such detailed information. However, the following publications are recited by way of examples of the detailed information available pertaining to the electronic devices herein referred to:

On Sample and Hold Amplifiers

"High Performance Sample and Hold Circuit" by Henry Ronhof, Application Report B45.

Published by:
Texas Instruments Ltd.,
Manton Lane,
Bedford, England.

On Multipliers and Dividers

"Frequency synthesisers" by K. Thrower, Chief Engineer, Racal Instruments Ltd.

Published by:
Electronic Equipment News—August 1969.

On Pulse Shaper and Trigger Circuits

"Semiconductor and Components Data Book 1 1968"

Published by:
Texas Instruments Ltd.,
Manton Lane,
Bedford, England.

In summary, the apparatus operates as follows:

The gear wheel 3, driven by the shaft 4, rotates continuously at a reasonably uniform speed. The stylus 9 is inserted into and withdrawn from successive tooth spaces by the piston-and-cylinder device 10, the stylus 9 being deflected in each tooth space by a tooth flank. Each stylus deflection produces a voltage output which is of ramp configuration. On the first occurrence when the said voltage output equals the preselected intermediate amplitude value, the trigger 19 is fired to synchronise the train of reference signals from the divider 14 with the event of said voltage value. Thereafter, the sample-and-hold amplifier 16, on each occurrence of a reference signal, measures the instantaneous amplitude values of tooth position signals from the probe 8 relative to the preselected intermediate amplitude value and feeds these measurements to the recorder 17.

Figure 3:
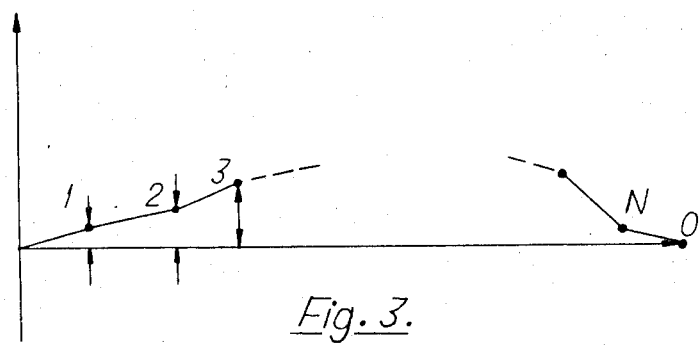
FIG. 3 shows an example of a pitch error curve obtained for a gear wheel by the apparatus of FIG. 1.

In FIG. 3, 0 represents the first, and datum, recording for a flank of the first tooth, and 1, 2, 3 ... N represent the readings for successive stylus deflections at the instant of a reference signal. Consequently, pitch errors for successive teeth as indicated by the distance of the points 1, 2, 3 . . . N from the datum, can be measured from the scale of the Y axis. After one revolution of the gear wheel, the stylus 9 will again be deflected by the initial or datum tooth and the datum deflection will be recorded.

Advantages of the above apparatus are that the first-measured deflection of the stylus 9 can be any value within a range about the mid-point of the voltage ramp but which does not, for practical reasons, approach the zero or maximum deflection values; and the insertion of the stylus into a tooth space does not require to occur at a precise moment but can occur at any time before the reference signal for measurement of the stylus deflection.

Also, the above described apparatus provides for very rapid checking of the teeth, of the order of one tooth per second; and the use of the circular grating and the transducer system for the stylus enables great accuracy in measuring, the grating having angular errors only of the order of one arc second whilst the transducer system may measure values in the range of a few micro-inches. Further, the testing apparatus of the present invention measures absolute pitch errors.

It will be appreciated that modifications are possible in the apparatus. For example, the piston-and-cylinder device could be replaced by an electric motor driving the carriage through suitable gearing, or by a solenoid. The piston and cylinder device could be controlled by the reference signals instead of a micro-switch. In such a case, the controlling reference signals would be appropriately out-of-phase with the main reference signals. Also, the measuring probe 8 may incorporate deflection or displacement detection means operating on the principle employed in air gauges. Also, it is envisaged that the optical source pulse generator may be replaced by, for example, a magnetic source pulse generator employing magnetic tape, or other electronic or electro-mechanical system.

Also, the apparatus of the present invention can be adapted for measuring pitch errors in toothed members other than gear wheels.

We claim:

1. Apparatus for measuring errors in the tooth pitch of a gear wheel, comprising a continuously rotatable support whereon a gear wheel may be mounted co-axially with the support for rotation therewith, a pulse generator connected to the rotatable support and adapted to produce a train of source pulses whose count is proportional to angular displacement of the rotatable support, digital processing means connected to the pulse generator and adapted to convert the source pulse train to a train of reference signals which are mutually spaced according to the specified tooth pitch of a gear wheel and including means operable to synchronise the reference signals with an external event, a measuring probe having a stylus which can be influenced so as to produce a tooth position signal of amplitude proportional to the amount by which the stylus is influenced, means co-operatevely associated with the support and with the measuring probe and adapted to insert from a fixed station adjacent the periphery of the rotatable support the stylus a selected radial distance into successive tooth spaces of a gear wheel when mounted on and rotated continuously by the rotatable support and to withdraw the stylus from each tooth space after the stylus has been influenced by a tooth flank, a trigger device connected to the probe and to the synchronising means of the digital processing means and sensitive to a selected intermediate amplitude value of the tooth position signal and operative on a first single occurence of the said intermediate amplitude value to synchronise the train of reference signals with the event of said intermediate amplitude value, a sampling device connected to the probe and to the digital processing means and adapted to measure the instantaneous amplitude value of the tooth position signal on the occurrence of each reference signal, and means connected to the sampling device for indicating or recording the instantaneous amplitude values measured by the sampling device.

2. Apparatus according to claim 1, wherein the source pulses are electrical source pulses.

3. Apparatus according to claim 2, wherein the pulse generator comprises a light source, a photo-electric transducer, a circular grating rotatable with the support, and one or more stationary indexing gratings co-operating with the circular grating to interrupt a light beam between the light source and the photo-electric transducer.

4. Apparatus according to claim 1, wherein the reference signals are electrical reference signals.

5. Apparatus according to claim 4, wherein the digital processing means comprises an electronic multiplier for multiplying the source pulse count by the number of teeth in a gear wheel, and an electronic divider for dividing the multiplier quotient by the source pulse count, the electronic divider incorporating the said synchronising means.

6. Apparatus according to claim 1, wherein the measuring probe comprises a mechanical-to-electrical transducer, said tooth position signal being an electrical tooth position signal.

7. Apparatus according to claim 1, wherein the said selected intermediate amplitude value is approximately equal to one-half of the maximum amplitude value of the stylus tooth position signal capable of being produced by the measuring probe.

8. Apparatus according to claim 1, including a pulse shaper associated with the digital processing means for improving the sharpness of definition of the reference signals.

* * * * *